(12) United States Patent
Xue et al.

(10) Patent No.: US 11,663,214 B2
(45) Date of Patent: May 30, 2023

(54) REPLAYING LARGE CONCURRENCY WORKLOAD (71) Applicant: SAP SE, Walldorf (DE)

(72) Inventors: Paul Xue, Xian Shaanxi (CN); Jian-ping Hui, Xian Shaanxi (CN); Peter Dorfman, Belmont, MA (US)

(73) Assignee: SAP SE, Walldorf (DE)

( * ) Notice: Subject to any disclaimer, the term of this patent is extended or adjusted under 35 U.S.C. 154(b) by 1065 days.

(21) Appl. No.: 15/370,381

(22) Filed: Dec. 6, 2016

(65) Prior Publication Data
US 2018/0157659 A1 Jun. 7, 2018

(51) Int. Cl.
G06F 9/50 (2006.01)
G06F 16/2455 (2019.01)

(52) U.S. Cl.
CPC ......... *G06F 16/2455* (2019.01); *G06F 9/505* (2013.01); *G06F 9/5083* (2013.01)

(58) Field of Classification Search
CPC ........ G06F 9/5083; G06F 9/505; G06F 30/20; G06F 16/2455
See application file for complete search history.

(56) References Cited

U.S. PATENT DOCUMENTS

| | | | |
|---|---|---|---|
| 7,890,458 B2 | 2/2011 | Dias et al. | |
| 8,442,941 B2 | 5/2013 | Yao et al. | |
| 8,732,126 B2 | 5/2014 | Dias et al. | |
| 8,954,397 B2 | 2/2015 | Wang et al. | |
| 9,069,704 B2 | 6/2015 | Schreter | |
| 2010/0333072 A1 | 12/2010 | Dulip et al. | |
| 2011/0035205 A1* | 2/2011 | Brideson | G06F 30/20 703/22 |
| 2011/0078666 A1 | 3/2011 | Altekar | |
| 2016/0350158 A1* | 12/2016 | Mealey | G06F 9/5038 |
| 2017/0004015 A1* | 1/2017 | Raja | G06F 9/5083 |

* cited by examiner

*Primary Examiner* — Marcin R Filipczyk
(74) *Attorney, Agent, or Firm* — Sterne, Kessler, Goldstein & Fox P.L.L.C.

(57) ABSTRACT

Disclosed herein are system, method, and computer program product embodiments for replaying a large concurrency workload. The embodiments disclosed herein may be used to test the workload capacity of a database. An embodiment operates by executing a first database transaction statement to a database. The execution status of the first database transaction statement is checked and the number of work threads connecting to the database is adjusted. In an embodiment, the number of work threads used may be less than the number of sessions simulated.

20 Claims, 8 Drawing Sheets

REPLAYING LARGE CONCURRENCY WORKLOAD

BACKGROUND

As more users are connecting to shared network resources, the workload for software and databases has also increased. In the workplace context, many users may access the same database at the same time, leading to a large concurrent workload for the database to service each user. Without an effective method of simulating and testing these large workloads, databases may not be prepared to handle the increased stress of user access.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for replaying a large concurrency workload. In an embodiment, replaying a large concurrency workload may allow for stress testing of a database. In an embodiment, replaying a large concurrency workload may allow for testing of a database's workload capacity.

Figure 1:
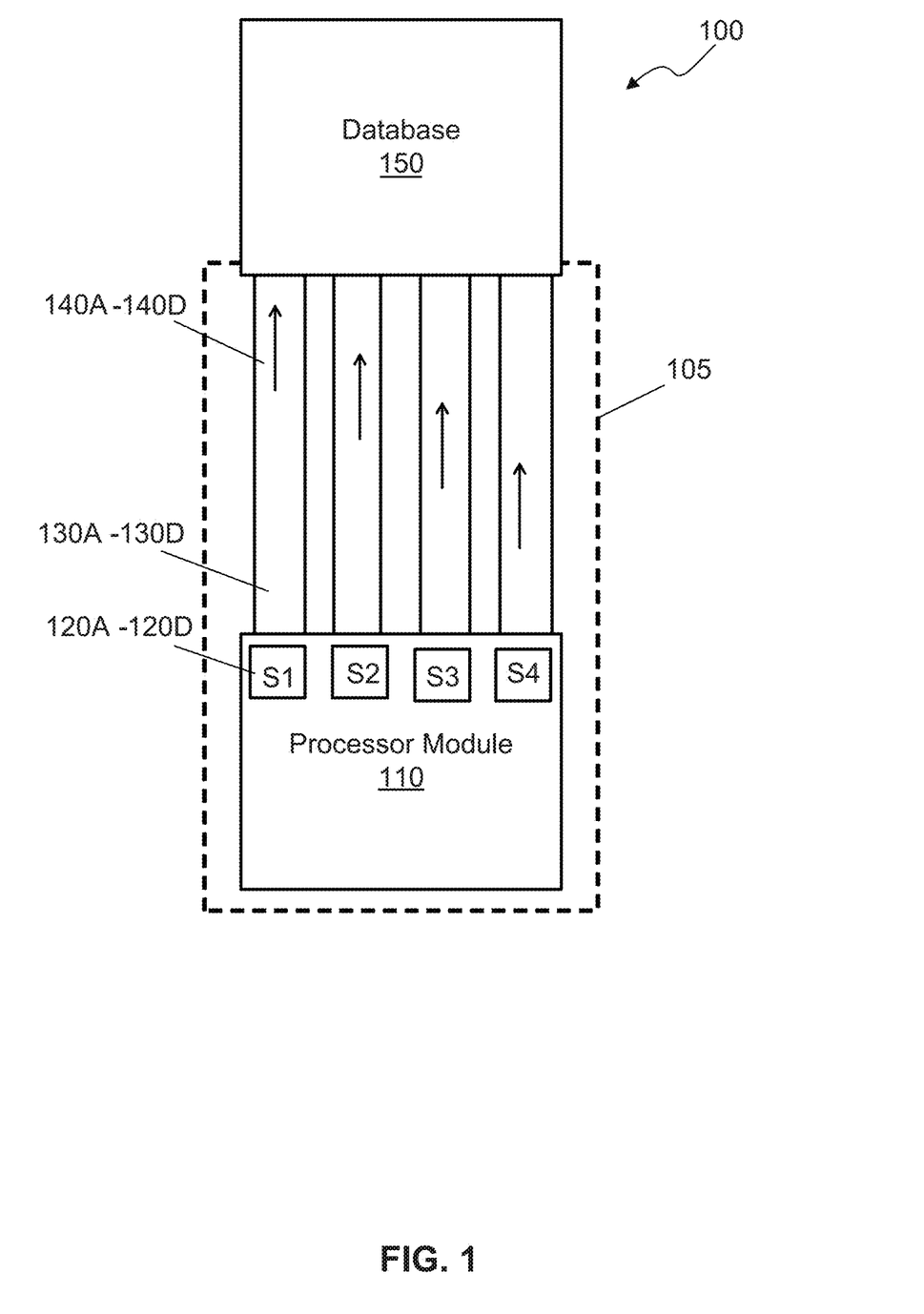
FIG. 1 is a block diagram of a system, according to some embodiments.

FIG. 1 is a block diagram of a system 100, according to some embodiments. System 100 may comprise application engine 105 and database 150. Application engine 105 may comprise processor module 110, sessions 120A-120D, and threads 130A-130D. In an embodiment, application engine 105 may comprise a tool for testing the workload capacity of a database 150. In an embodiment, application engine 105 may simulate a plurality of active connections attempting to access database 150. The plurality of active connections may attempt to access database 150 concurrently. In an embodiment, testing the workload of a database 150 may comprise executing database transaction statements 140A-140D. In an embodiment, application engine 105 may replay the database transaction statements 140A-140D to test the workload capacity of database 150.

Processor module 110 may comprise processors, FPGAs, memory, circuitry, a server, a computer, an operating system, a software application, a combination thereof, and/or the like. In an embodiment, processor module 110 may control the sequencing and timing of database transaction statements. Processor module 110 may also control the number of active connections attempting to access the database 150. In an embodiment, processor module 110 comprises sessions 120A-120D. In an embodiment, sessions 120A-120D may represent active connections attempting to access database 150. Processor module 110 may simulate sessions 120A-120D to test the workload of database 150. If processor module 110 comprises a software application or an operating system, sessions 120A-120D may represent virtual connections from different sources. For example, each of session 120A-120D may comprise a simulation of a different client computer attempting to access database 150. From the viewpoint of database 150, database 150 may appear to be interfacing with four distinct systems based on sessions 120A-120D. In an embodiment, processor module 110 may virtually simulate the four sessions 120A-120D.

In an embodiment, session 120A-120D may access database 150 using threads 130A-130D. Taken together, threads 130A-130D may represent a "thread pool" or "connection pool" utilized in connecting processor module 110 to database 150. In an embodiment shown in FIG. 1, a single thread corresponds to a single session; that is, thread 130A may be utilized by session 120A but may not be utilized by sessions 120B-120D.

In an embodiment, sessions 120A-120D utilize threads 130A-130D to communicate with database 150 via database transaction statements 140A-140D. In an embodiment, database transaction statements 140A-140D may comprise SQL statements, information stored on database 150, database statement execution feedback, error messages, an execution result, a combination thereof, and/or the like. Database transaction statements 140A-140D may be transmitted from processor module 110 and received by database 150. Database transaction statements 140A-140D may also be transmitted from database 150 and received by processor module 110.

Figure 2A:
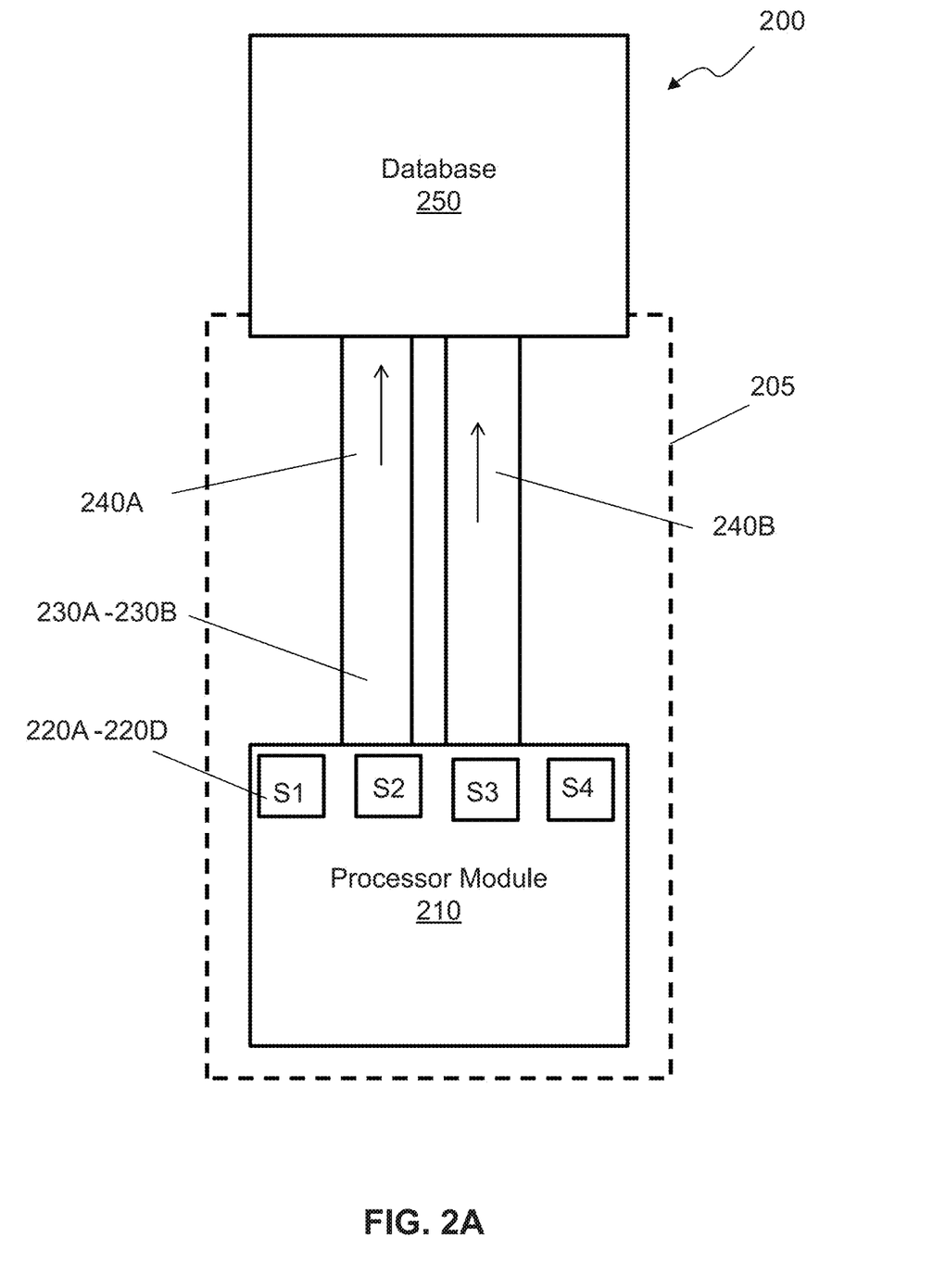
FIG. 2A is a block diagram of a system, according to some embodiments.
Figure 2B:
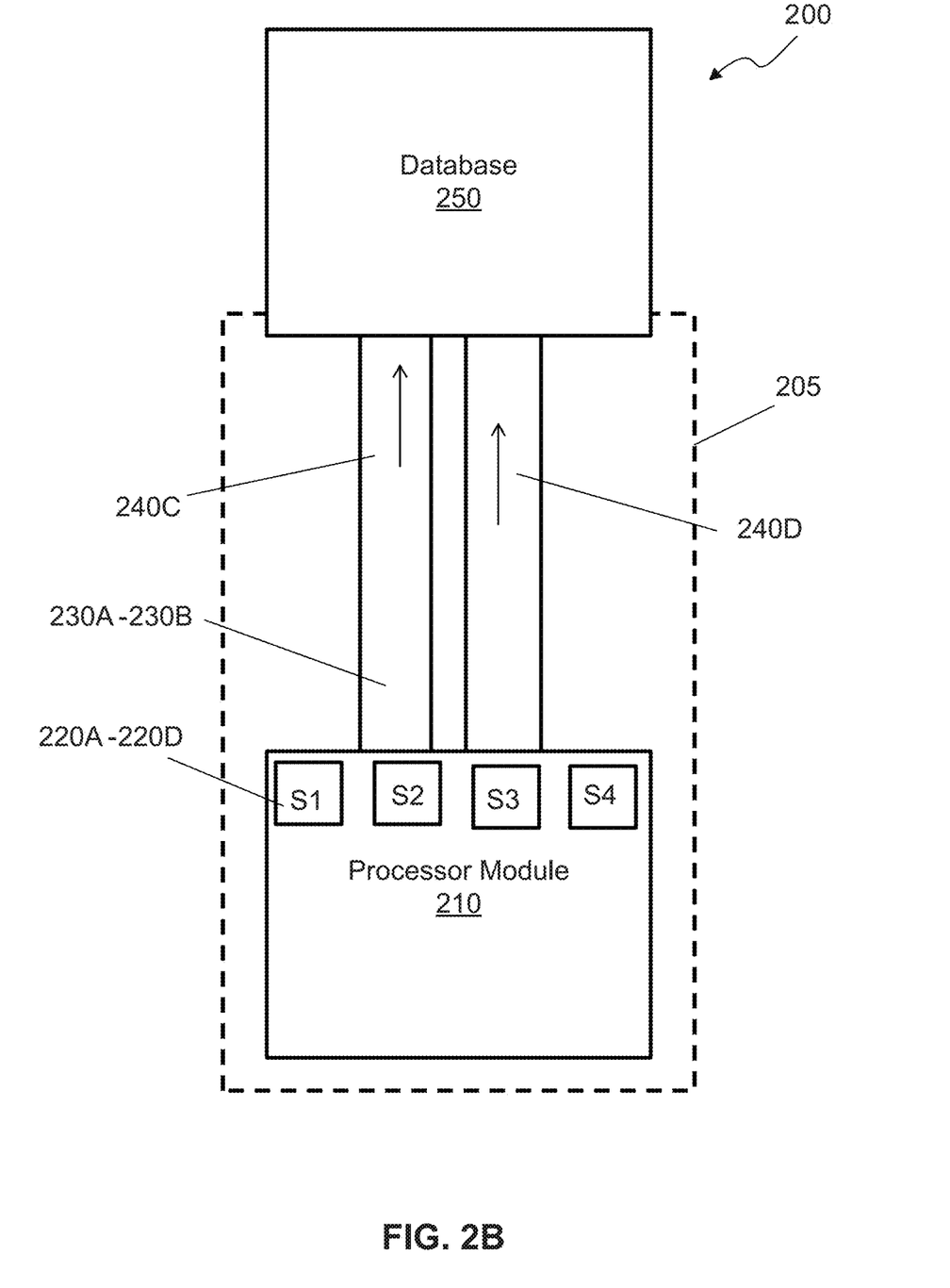
FIG. 2B is a block diagram of a system, according to some embodiments.

FIG. 2A is a block diagram of a system 200, according to some embodiments. FIG. 2B is a block diagram of a system 200, according to some embodiments. System 200 may comprise an application engine 205 and a database 250. Application engine 205 may comprise processor module 210, sessions 220A-220D, and threads 230A-230B. In an embodiment, application engine 205 may comprise a tool for testing the workload capacity of a database 250. In an embodiment, application engine 205 may simulate a plurality of active connections attempting to access database 250. The plurality of active connections may attempt to access database 250 concurrently. In an embodiment, testing the workload of a database 250 may comprise executing database transaction statements 240A-240B. In an embodiment, application engine 205 may replay the database transaction statements to test the workload capacity of database 250.

Compared to the embodiment shown in FIG. 1, FIG. 2A depicts an embodiment wherein processor module 210 comprises four sessions 220A-220D but only two threads 230A-230B. In an embodiment, the four sessions 220A-220D utilize the two threads 230A-230B to communicate with database 250 via database transaction statements 240A-240B. In an embodiment, the four sessions 220A-220D are configured to utilize the two threads 230A-230B by removing the sessions status from a thread and storing the sessions status information in a global data structure. For example, after session 220A successfully transmits database transaction statement 240A via thread 230A to database 250, processor module 210 may remove the session status information from thread 230A and store the session status information in a global data structure. As a result, thread 230A may become stateless and thus shareable by the other sessions 220B-220D. In an embodiment shown in FIG. 2B, session 220C may utilize thread 230A to send database transaction statement 240C to database 250. The reduction in thread count between FIG. 1 and FIG. 2A-2B may represent any numerical reduction in thread count where the number of sessions created by processor module 210 is greater than the number of threads utilized.

By reducing the number of threads used by processor module 210, the workload of processor module 210 may be reduced. In an embodiment where processor module 210 represents an operating system using one separate thread for each session, scalability may be limited. As the number of simulated sessions and threads increase, the resources of consumed may also increase. Based on the hardware limitations of processor module 210, the increasing number of threads may yield a higher overhead resource cost that outweighs the benefits of simulating a larger number of sessions. That is, the increasing number of threads may reduce the ability of existing threads to execute database transaction statements effectively, causing delay that reduces the number of database transaction statement that may be replayed per second.

By allowing the threads 230A-230B to be sharable by sessions 220A-220D and by reducing the number of threads used by processor module 210 to connect to database 250, fewer processor module 210 resources may be used to simulate the same number of sessions 220A-220D. In an embodiment, this idea may extend to the testing scenario of simulating tens, hundreds, or thousands of sessions. A greater number of sessions may be simulated when compared to utilizing a single thread for a single session.

In an embodiment, optimization may occur regarding the optimal number of threads used for executing database transaction statements. In an embodiment, processor module 210 may increase the number of threads used to simulate the optimal session and thread configuration for a certain workload. In an embodiment, testing of database 250 utilizes all of the hardware resources of processor module 210 without using too many threads that would lead to overuse of hardware resources. Overusing hardware resources may lead to poor performance when attempting to test the workload capacity of a database. When hardware resources are overused, database transaction statements may fail to properly execute. In an embodiment, database 250 may return an error message as a result of the overuse.

By replaying or re-executing database transaction statements using the optimal number of threads, more sessions may be simulated by processor module 210 without interfering with existing sessions. Thus, replay performance may be optimized, allowing processor module 210 to simulate more sessions, or maximize the number of simulated sessions, while still maintaining successful executions of database transaction statements.

Figure 2C:
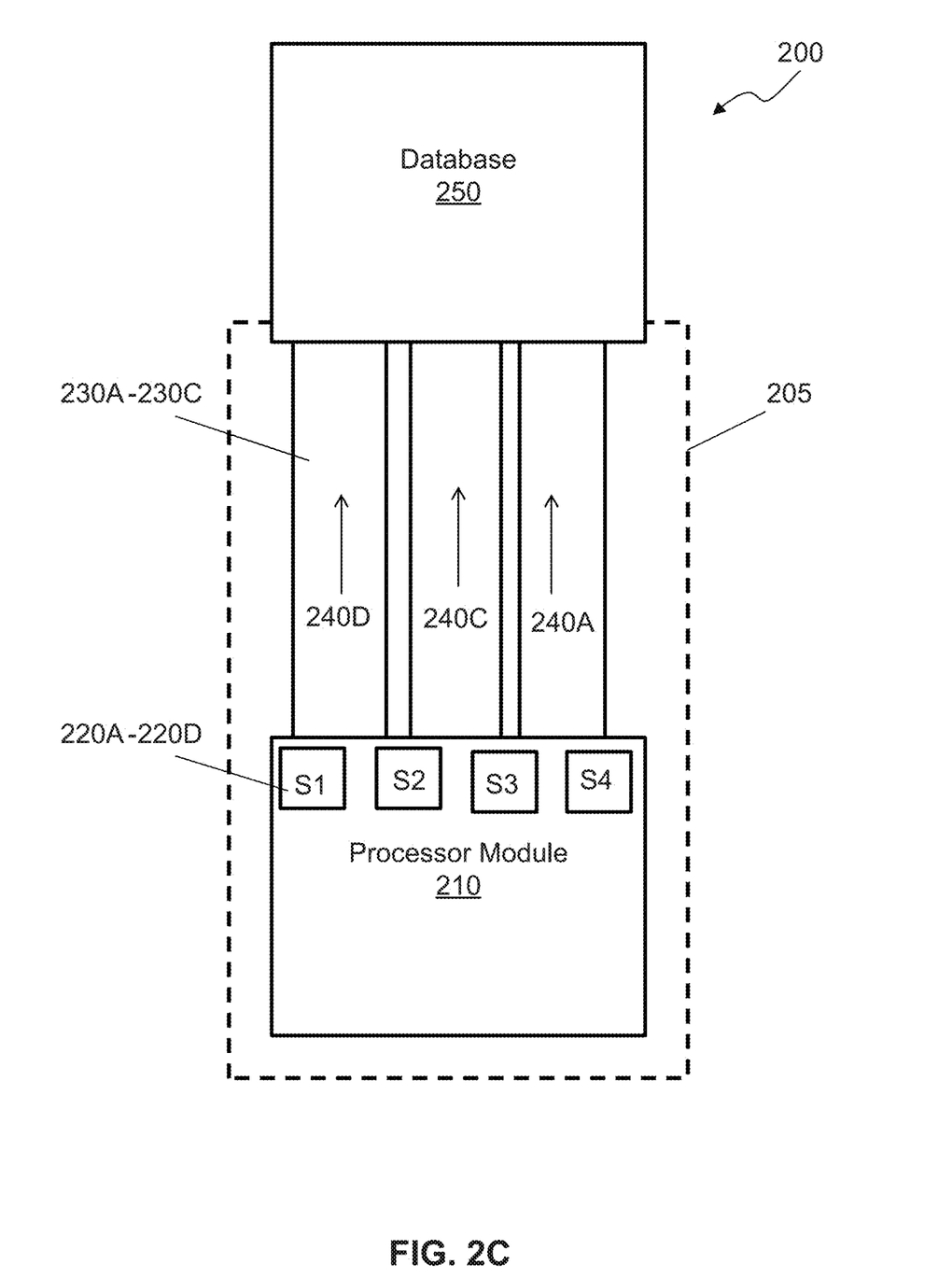
FIG. 2C is a block diagram of a system, according to some embodiments.

FIG. 2C is a block diagram of a system 200, according to some embodiments. System 200 may comprise an application engine 205 and a database 250. Application engine 205 may comprise processor module 210, sessions 220A-220D, and threads 230A-230C. In an embodiment, application engine 205 may transition from the two-thread embodiment depicted in FIG. 2A and FIG. 2B to the three-thread embodiment depicted in FIG. 2C. In an embodiment, sessions 220A-220D may share threads 230A-230C in order to transmit database transaction statements 240A, 240C-240D. In an embodiment, one session is not bound to only use one specific thread, but may use a thread that is idle or not currently executing a database transaction statement.

Regarding optimization, processor module 210 may determine that three threads maximize the number of database transaction statements that may be replayed per second. For example, after executing database transaction statements 240C and 240D, processor module 210 may determine that sufficient hardware resources are available to generate and maintain a new thread for connecting to database 250. In an embodiment, increasing the number of threads in the thread pool may allow a greater number of database transactions that may be executed or replayed each second. In an embodiment, application engine 205 may still utilize fewer threads than sessions.

In an embodiment, processor module 210 may begin using the three thread configuration depicted in FIG. 2C but may transition to the two thread configuration depicted in FIG. 2A and FIG. 2B. Processor module 210 may determine that the three thread configuration may be overusing the hardware resources of processor module 210. Overusing hardware resources may lead to failed executions of database transaction statements to database 250. Overusing hardware resources may also reduce the number of database transaction statements that may be replayed as the number of sessions increases. In an embodiment, database 250 may return an error message in response to a failure to execute database transaction statements as a result of the overuse of hardware resources. Thus, processor module 210 may transition from the three thread configuration to the two thread configuration to optimize the replaying of database transaction statements.

Figure 3:
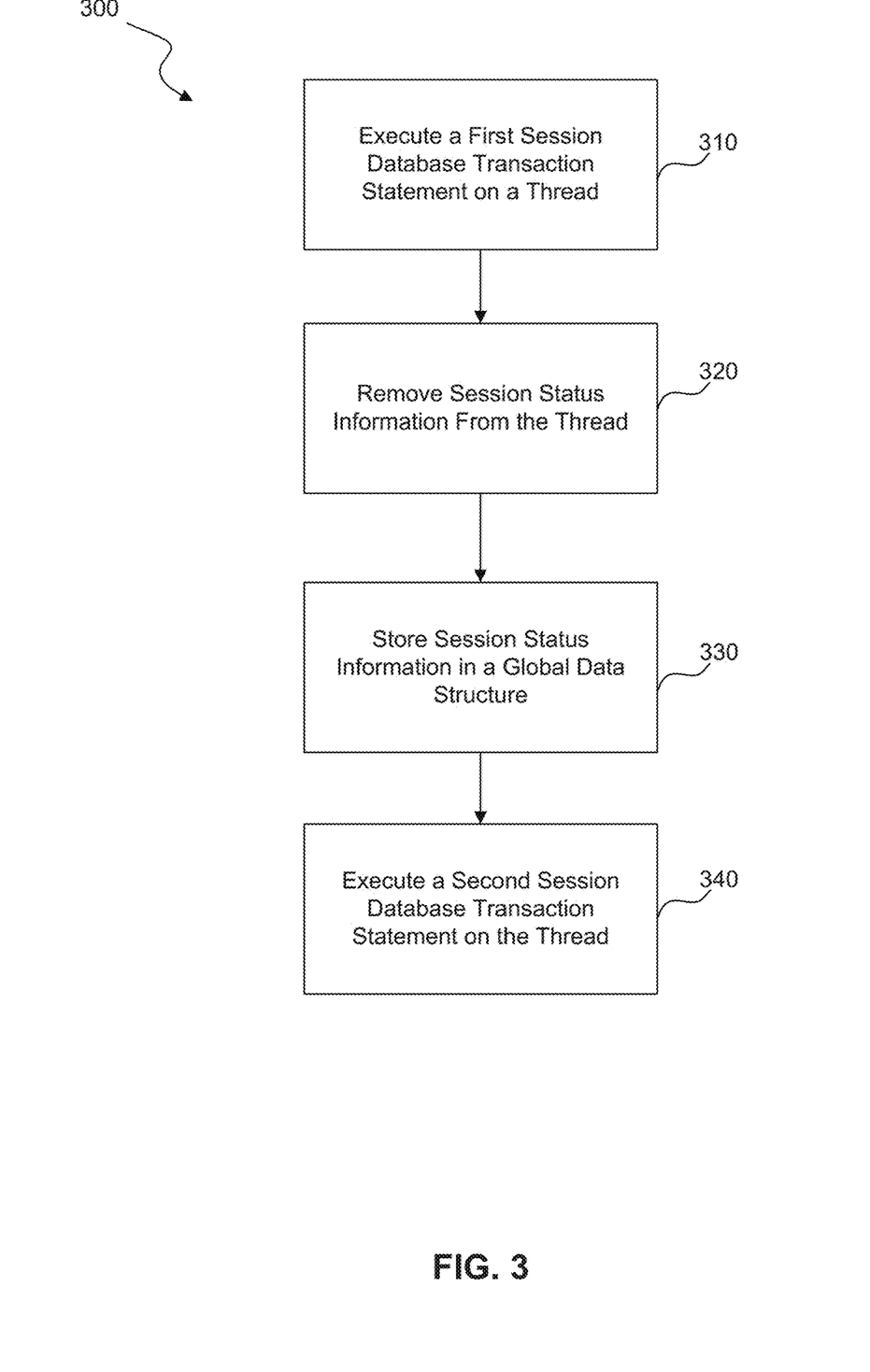
FIG. 3 is a flowchart illustrating a method for replaying a large concurrency workload, according to some embodiments.

FIG. 3 is a flowchart illustrating a method 300 for replaying a large concurrency workload, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 3. However, method 300 is not limited to that example embodiment. In an embodiment, method 300 may demonstrate a process for creating a sharable thread pool. A shareable thread pool may allow different sessions to use the same thread when executing database transaction statements to a database. A sharable thread pool may also allow a testing application to simulate a number of sessions greater than the number of threads being used.

In 310, a first session may execute a first database transaction statement to a database using a thread. In an embodiment, executing the first database transaction statement causes the thread to retain session status information regarding the first session. In an embodiment, a processor module may begin the execution and transmit a database transaction statement to a database. In an embodiment, the database may provide feedback to the processor module regarding the status of the execution. Feedback may comprise a success or failure message regarding the execution of the database transaction statement. For example, in an embodiment, overuse of the hardware resources of the processor module may prevent successful execution of the database transaction statement. In this embodiment, the database may return an error message noting this failure to execute. In an embodiment, the execution failure may occur due to database hardware or software limitations. In an embodiment, the database may utilize a thread to transmit the feedback. In an embodiment, the database may utilize the same or a different thread that was used during the execution of the first database transaction statement.

In 320, session status information from a thread may be removed. In an embodiment, the processor module that has executed the first database transaction may remove the session status information from the thread. Removing the session status information from a thread may cause the thread to become stateless. As a result, the thread may be shared by other sessions.

In 330, session status information may be stored in a global data structure. In an embodiment, the session status information stored may be the same session status information previously removed from the thread. Storing the session status information may be used in future executions of database transaction statements. For example, in an embodiment, the processor module may dictate that the first session use a different thread to transmit a second database transaction statement to the database. In this situation, the processor module may retrieve the session status information from the global data structure in preparation for the second database transaction statement transition.

In 340, a second session database transaction statement may be executed on the same thread that that executed the first session database transaction statement. In an embodiment, the same session may execute the first and second database transaction statements. In an embodiment, two different sessions may execute the first and second database transaction statements. In an embodiment, the first and second database transaction statements may comprise different content, such as a different stream of SQL statements. In an embodiment, the first and second database transaction statements may comprise the same content. In an embodiment where a second session is executing the second database transaction statement, rather than the first session, the same thread will have been able to support the use of different sessions to execute database transaction statements.

Figure 4:
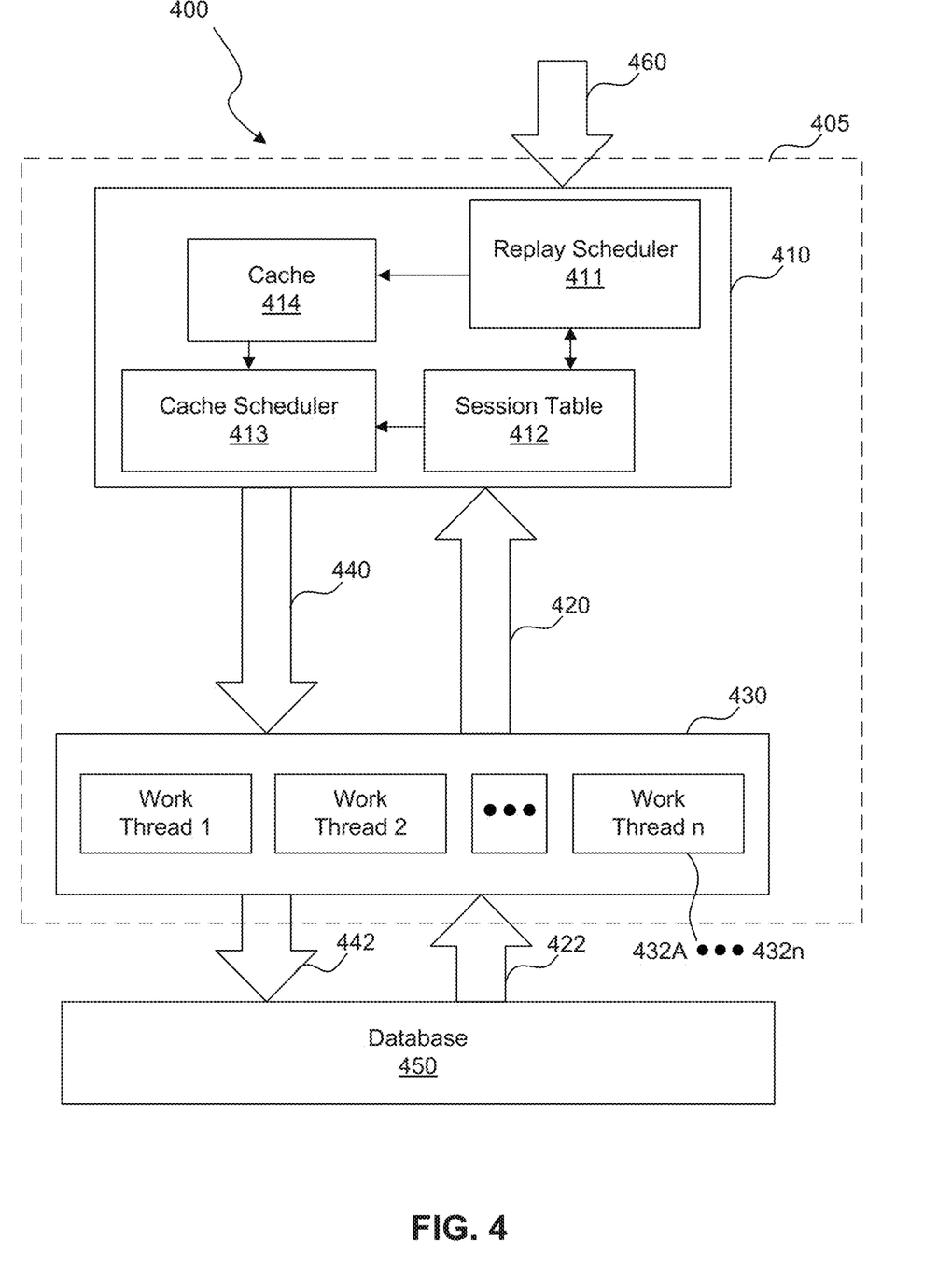
FIG. 4 is a block diagram of an application engine, according to some embodiments.

FIG. 4 is a block diagram of a system 400, according to some embodiments. System 400 may comprise an application engine 405 and a database 450. Application engine 405 may comprise processor module 410 and thread pool 430. Execution data path 440 and feedback data path 420 may connect processor module 410 to thread pool 430. Thread pool 430 may comprise a work threads 432A . . . 432n. Work threads 432A . . . 432n may be generated and maintained by using the system resources of application engine 405. Thread pool 430 may connect to database 450 through execution data path 442 and feedback data path 422. Processor module 410 may utilize thread pool 430, execution data paths 440, 442, and feedback data paths 420, 422 to interface with database 450.

Processor module 410 may comprise processors, FPGAs, memory, circuitry, a server, a computer, an operating system, a software application, a combination thereof, and/or the like. In an embodiment, processor module 410 may comprise threads, such as replay scheduler 411 and cache scheduler 413. Processor module 410 may also comprise memory, such as session table 412 and cache 414. In an embodiment, replay scheduler 411 may control the sequencing, timing, and synchronization of database statements. Replay scheduler 411 may receive a database transaction statement 460 from a source external to processor module 410. In an embodiment, replay scheduler 411 may receive a database transaction statement 460 from a source external to application engine 405. Replay scheduler 411 may execute a database transaction statement to thread pool 430 via execution data path 440.

Thread pool 430 may exist on circuitry separate from processor module 410, meaning that execution data communication path 430 may be an electrical connection between electrical components. In an embodiment, processor module 410 and thread pool 430 may reside on the same piece of hardware. In an embodiment, processor module 410 and thread pool 430 may be constructed using software. Utilizing execution data path 440, replay scheduler 411 may also control and adjust the number of work threads 432A . . . 432n in thread pool 430.

Replay scheduler 411 may also store database transaction statements into cache 414. In an embodiment, replay scheduler 411 may store a database transaction statement corresponding to a session in cache 414 in response to determining that an earlier database transaction statement has not finished execution. In an embodiment, cache 414 may store a plurality of database transaction statements corresponding to a plurality of sessions. In an embodiment, processor module 410 may operate without cache 414.

In an embodiment, replay scheduler 411 may also interact with session table 412 to obtain session status information, such as, for example, database transaction statement execution completion or failure. In an embodiment, session table 412 may store session status information, feedback from database 450, database transaction statement execution, synchronization, timing information, a combination thereof, and/or the like. Feedback from database 450 may be transmitted to session table 412 utilizing feedback data path 420.

In an embodiment, processor module 410 may comprise cache scheduler 413. Cache scheduler 413 may interface with session table 412 by receiving session status information, database feedback information, a combination thereof, and/or the like. Using this information, cache scheduler 413 may retrieve database transaction statements stored in cache 414 and execute these database transaction statements using execution data path 440. In an embodiment, replay scheduler 411 and cache scheduler may coordinate the execution of a database transaction statement stored in cache 414 after determining, by utilizing information stored in session table 412, that a first database transaction statement has finished execution.

In an embodiment, processor module 410 may comprise a plurality of sessions. In an embodiment, the sessions may represent active connections attempting to access database 450. Processor module 410 may simulate these sessions to test the workload of database 450. If processor module 410 comprises a software application or an operating system, the sessions may represent virtual connections from different sources. For example, each session may simulate a different client computer attempting to access database 450. From the viewpoint of database 450, database 450 may appear to be interfacing with a plurality of distinct systems based on the various simulated sessions.

In an embodiment, processor module 410 may utilize thread pool 430, along with execution data paths 440, 442, and feedback data paths 420, 422 to interface with database 450. In an embodiment, processor module 410 may utilize work threads 432A . . . 432n in interfacing with database 450. In an embodiment, processor module 410 may increase the number of work threads in thread pool 430, decrease the number of work threads in thread pool 430, or both increase and decrease thread pool 430. In an embodiment, processor module 410 may decrease the size of thread pool 430 by releasing idle work threads. In an embodiment, releasing idle work threads comprises de-allocating system resources of application 400 that were maintaining the work threads. In an embodiment, processor module 410 may increase the size of thread pool 430 when no idle thread is available to transmit a database transaction statement. In an embodiment, increasing the size of thread pool 430 may comprise generating a new idle work thread. Generating a new idle work thread may comprise allocating system resources of application engine 405 to maintain a new thread connection.

In an embodiment, processor module 410 may receive a database transaction statement 460. Database transaction statement 460 may comprise SQL statements, database queries, information to be stored on a database, a combination thereof, and/or the like. Database transaction statement 460 may further comprise a timestamp. Database transaction statement 460 may be sent to processor module 410 from memory or from a disk external to application engine 405. In an embodiment, processor module 410 may control the sequence and speed of execution of database transaction statement 460. For example, processor module 410 may receive many database transaction statements and may place the database transaction statements in a particular sequences for execution. In an embodiment, processor module 410 may replay database transaction statements in order to test the workload capacity of database 450. In the replay testing embodiment, processor module 410 may monitor the sequence and speed of replay as well as the number of simulated sessions. Processor module 410 may also control thread pool 430 to optimize the number of work threads 432A . . . 432n for simulating a predetermined number of sessions.

In an embodiment, database 450 may provide database session feedback using feedback data path 422. Database session feedback may comprise SQL statements, information stored on database 450, database statement execution feedback, error messages, an execution result, a combination thereof, and/or the like. Database 450 may utilize feedback data paths 420, 422 and thread pool 430 to transmit database session feedback to processor module 410. In an embodiment, database session feedback may report that a database transaction statement was successfully executed to database 450. In an embodiment, database session feedback may report that a database transaction statement failed to execute to database 450. In an embodiment, if processor module 410 receives database session feedback from feedback data paths 420, 422 and thread pool 430 that a database transaction statement failed to execute, processor module 410 may decrease the number of work threads in thread pool 430. Decreasing the size of thread pool 430 may occur via an adjust pool size command sent from processor module 410 or replay scheduler 411 using execution data paths 440.

In an embodiment, if processor module 410 receives database session feedback that a database transaction statement successfully executed, processor module 410 may attempt to execute another database transaction statement. In executing another database transaction statement, processor module 410 may check if any idle work threads in thread pool 430 are available. If none are available, processor module 410 may generate a new work thread and increase the size of thread pool 430. Increasing the size of thread pool 430 may occur via an adjust pool size command sent from processor module 410 or replay scheduler 411 using execution data path 440. The successful execution of a database transaction statement and the generation of a new work thread may imply that processor module 410 has not yet reached its limit in simulating sessions and threads. As the number of sessions and threads increases, a more accurate stress test of database 450 may be possible.

Figure 5:
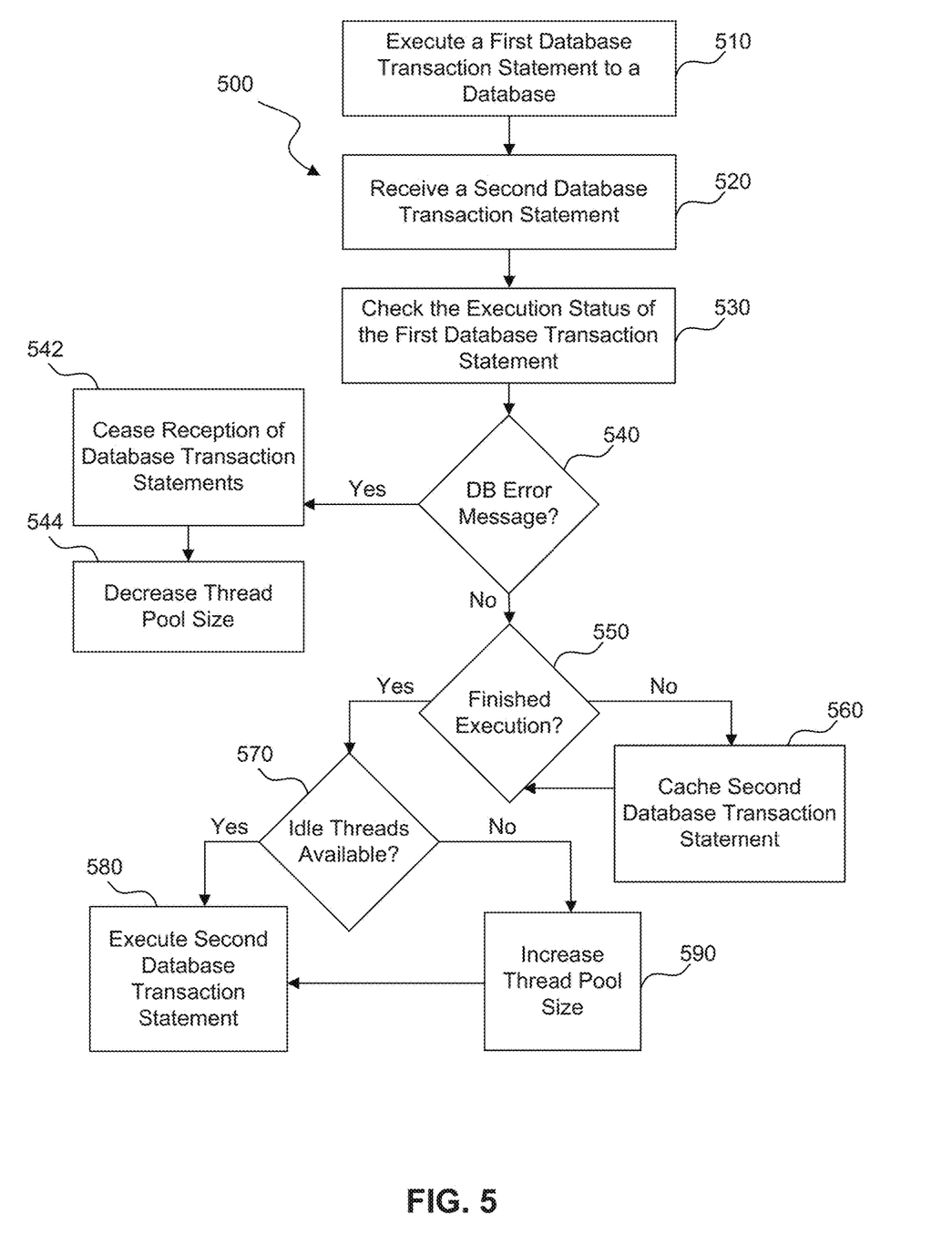
FIG. 5 is a flowchart illustrating a method for replaying a large concurrency workload, according to some embodiments.

FIG. 5 is a flowchart illustrating a method 500 for replaying a large concurrency workload, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 5. However, method 500 is not limited to that example embodiment. In an embodiment, method 500 may demonstrate a process for replaying a large concurrency workload. Replaying a large concurrency workload according to method 500 may allow an application engine to simulate a large number of sessions while continuing to maintain high level of performance with a consistent number of database transaction statements replayed per second. As a result, performance of an the application does not degrade as the number of concurrent sessions increases.

In 510, an application engine may execute a first database transaction statement to a database. In an embodiment, the application engine may utilize a thread in a thread pool to execute the statement. In an embodiment, the first database transaction statement may be associated with a first session. A simulated session may execute a database transaction statement to the database.

In 520, an application engine may receive a second database transaction statement. The second database transaction statement may be associated with a second session. In an embodiment, the second database transaction statement may be associated with the first session. The first session may attempt to replay the same database transaction statement. In this embodiment, the second database transaction statement may comprise the same content as the first database transaction statement.

In 530, an application engine may check the execution status of the first database transaction statement. In an embodiment, the execution status may comprise feedback from the database regarding the execution. Feedback may comprise SQL statements, information stored on the database, database statement execution feedback, error messages, an execution result, a combination thereof, and/or the like. In an embodiment, the execution status may comprise information regarding whether the first database transaction statement has finished execution. In an embodiment, the execution status may comprise information regarding whether the first database transaction is still in the process of execution.

In 540, the application engine may check if the database has produced an error message in supplying feedback to the application engine. In an embodiment, an error message may indicate that the first database transaction statement was not successfully executed to the database. In an embodiment, receiving an error message may comprise receiving a non-responsive message from the database or receiving no response from the database. In an embodiment, an error message may indicate that the application engine has reached its limit in executing database transaction statements. The application engine may have overused its system resources. If the database has produced an error message, the application engine may execute 542. If the database has not produced an error message or has produce a message indicating the success of executing the first database transaction statement, the application engine may execute 550.

In 542, if a database error message is received, the application engine may cease reception of database transaction statements. In an embodiment, the application engine will not add new database transaction statements to a queue for execution. In an embodiment, the application engine may continue to replay the already existing database transaction statements.

In 544, if a database error message is received, the application engine may decrease the thread pool size. In an embodiment, decreasing the thread pool size may occur by releasing idle threads. In an embodiment concerning replay testing, decreasing the thread pool size will prevent more database transaction statements from being added to the pool of database transaction statements to be replayed. By preventing the addition of more database transaction statements, existing database transaction statements will be able to utilize more system resources. Further, system resources will not be overused in a manner that degrades performance. In an embodiment, the thread pool size may be decreased in response to a database error message without first ceasing the reception of database transaction statements.

In 550, an application engine may check if the first database transaction statement has finished execution to the database. In an embodiment, the application engine may obtain session status information to check the execution status. Session status information may be stored in a thread, cache, memory, buffer, a combination thereof, and/or the like. If the first database transaction statement has not finished execution, the application engine may execute 560. If the first database transaction statement has finished execution, the application engine may execute 570.

In 560, if the first database transaction statement has not finished execution, an application engine may cache the second database transaction statement. The second database transaction statement may be cached in a cache or in memory. The cache or memory may be disposed within the application engine. The second database transaction statement may be cached to preserve a specific ordering of the execution of database transaction statements. In an embodiment, if the second database transaction statement is cached, the application engine will sequence the second database transaction statement to be executed after the first database transaction statement has finished execution. The application engine may continue to check the execution status of the first database transaction statement at 550 to determine whether the first database transaction statement has finished execution. If the first database transaction statement has finished execution, the application engine may execute 570.

In an embodiment, the application engine may simulate a plurality of sessions. In this embodiment, multiple second database transaction statements may be cached depending on the execution status of the first database transaction statements associated with the same session as the second database transaction statements. For example, if a first database transaction statement associated with Session 1 has not finished execution, a second database transaction statement associated with Session 1 may be cached to await completion of the execution. This caching may occur among a plurality of sessions.

In 570, an application engine may check if any idle threads are available. A thread may be idle if it is stateless. In an embodiment, a thread is idle if it is not executing a database transaction statement. In an embodiment, a pool of threads are available. In this embodiment, a plurality of sessions may share the thread pool to execute database transaction statements. At 570, the application engine may check whether any of the threads in the pool are not executing a database transaction statement. If no idle threads are available, application engine may execute 590. If idle threads are available, application engine may execute 580.

In 580, the second database transaction statement may be executed. In an embodiment, the execution of the second database transaction statement may occur in the same manner as the execution of the first database transaction statement at 510. In an embodiment, the second database transaction statement may be executed using the same thread utilized by the first database transaction statement. In an embodiment, the second database transaction statement may be executed using a thread different from the one used by the first database transaction statement. In an embodiment, the execution of the second and first database transaction statements may occur utilizing method 300 as described in reference to FIG. 3.

In 590, the thread pool size may be increased. In an embodiment, the thread pool size may be increased if no idle threads are available and the first database transaction statement has finished execution. The application engine may increase the thread pool size by generating a new idle thread. To generate a new thread, the application engine may allocate available system resources to maintain a new thread. After a new thread is generated at 590, the application engine may execute the second database transaction statement utilizing the new thread pool at 580.

Throughout method 500, a plurality of sessions may be simulated by the application engine. In an embodiment, the first and second database transaction statements are associated with a first session. In an embodiment, the number of simulated sessions may be predetermined and fixed. In an embodiment, the number of simulated sessions may be variable. In an embodiment, the number of simulated sessions may be optimized based factors related to testing the workload capacity of the database.

The application engine may simulate multiple sessions and utilize method 500 on each of the simulated sessions. As method 500 is repeated for each statement that is executed, an optimal number of threads may be reached so that system resources are not overly consumed. In an embodiment, the number of threads is maximized to the limit where the database returns a database error message. If a database error message is received, the optimal number of threads has been reached.

In an embodiment, the simulation of the multiple sessions and utilization of method 500 may be used to test the workload capacity of a database. The application engine may simulate a large amount of active connections to simulate a large workload of client computers attempting to access the database concurrently. By utilizing method 500, the optimal number of threads, based on the system resource limitations of the application engine, may be reached.

Figure 6:
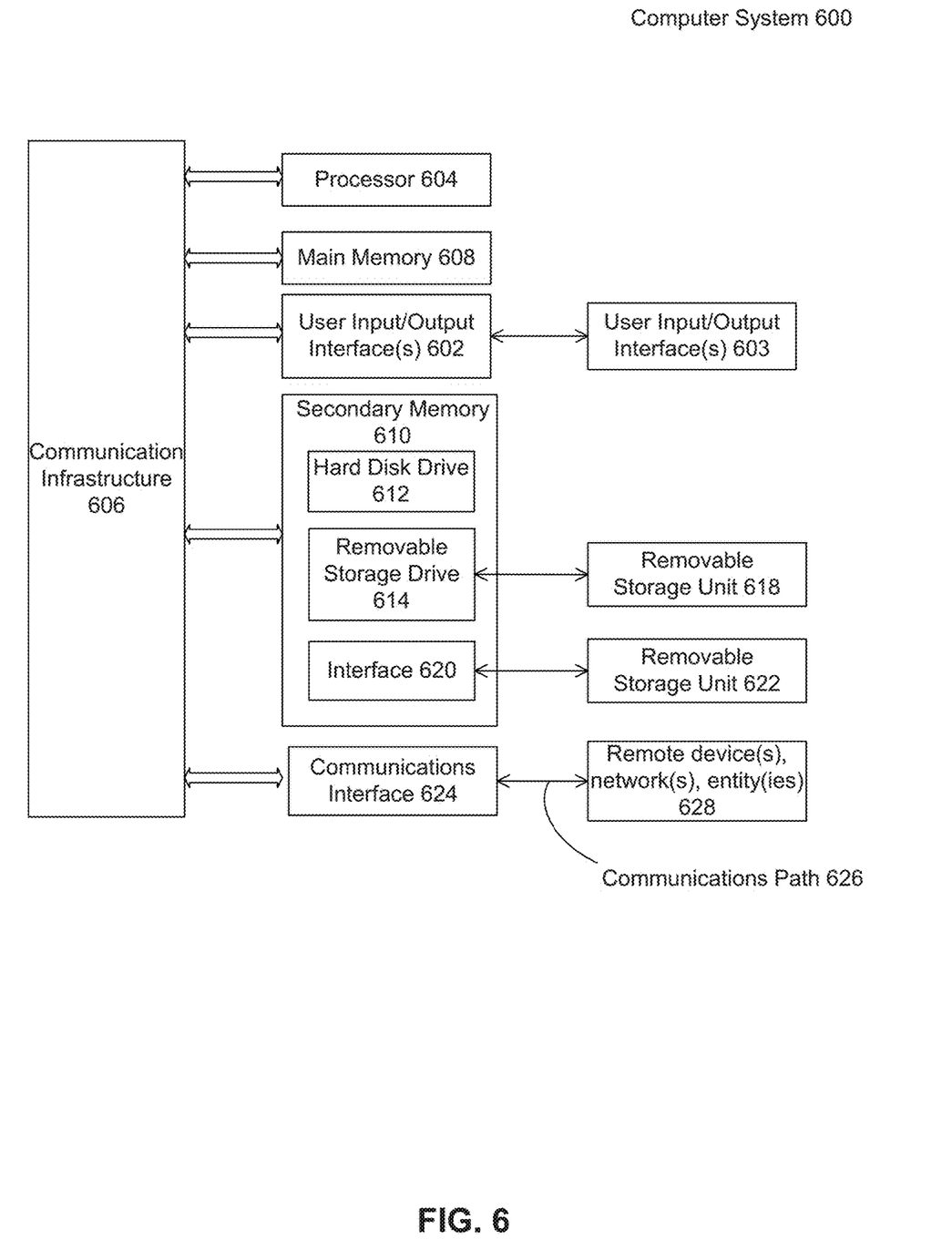
FIG. 6 is an example computer system useful for implementing various embodiments.

Various embodiments can be implemented, for example, using one or more computer systems, such as computer system 600 shown in FIG. 6. Computer system 600 can be used, for example, to implement method 500 of FIG. 5. For example, computer system 600 can execute and cache database transaction statements as well as control the size of a thread pool, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 6. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method, comprising:
   simulating, by one or more processors in a computing device, a plurality of sessions, wherein each session of the plurality of sessions represents a respective client computer attempting to access a database, wherein the one or more processors are connected to the database via a thread pool;

executing a first database transaction statement to the database via a first work thread in the thread pool, wherein the first database transaction statement corresponds to a first session of the plurality of sessions;

receiving, via a feedback data path connecting the one or more processors and the thread pool, feedback from the database regarding an execution status of the first database transaction statement;

receiving a second database transaction statement corresponding to the first session; and determining a maximum number of work threads in the thread pool by:
  generating a new idle work thread to increase the maximum number of work threads in the thread pool when the feedback indicates a successful execution of the first database transaction statement and based on an availability of a hardware resource of the one or more processors in the computing device; and
  executing the second database transaction statement to the database via the new idle work thread in the thread pool based on the execution status of the first database transaction statement.

2. The computer-implemented method of claim 1, the executing the second database transaction statement further comprising:
  obtaining the execution status of the first database transaction statement by obtaining session status information corresponding to the first session.

3. The computer-implemented method of claim 1, wherein the execution status of the first database transaction statement indicates that the first database transaction statement has completed execution, the executing the second database transaction statement further comprising:
  wherein generating the new idle work thread is further based on a determination that an idle work thread is not available in the thread pool.

4. The computer-implemented method of claim 1, wherein the execution status of the first database transaction statement indicates that the first database transaction statement has not completed execution, the executing the second database transaction statement further comprising:
  caching the second database transaction statement; and
  retrieving the second database transaction from the cache when the first database transaction statement has completed execution.

5. The computer-implemented method of claim 1, further comprising:
  removing session status information from the first work thread executing the first database transaction; and
  storing the session status information in a data structure.

6. The computer-implemented method of claim 1, further comprising:
  updating, based on the feedback, session status information corresponding to the first session.

7. The computer-implemented method of claim 1, wherein the feedback comprises an error message, the method further comprising:
  in response to receiving the error message, removing a work thread from the thread pool.

8. The computer-implemented method of claim 1, further comprising:
  executing a third database transaction statement corresponding to a second session on the first work thread.

9. The computer-implemented method of claim 1, wherein the first database transaction statement and the second database transaction statement comprise identical data.

10. A system, comprising:
a memory; and
at least one processor coupled to the memory and configured to:
  simulate a plurality of sessions, wherein each session of the plurality of sessions represents a respective client computer attempting to access a database, wherein the at least one processor is connected to the database via a thread pool;
  execute a first database transaction statement to the database via a first work thread in the thread pool, wherein the first database transaction statement corresponds to a first session of the plurality of sessions;
  receive, via a feedback data path connecting the at least one processor and the thread pool, first feedback from the database regarding an execution status of the first database transaction statement, wherein the first feedback indicates successful execution of the first database transaction statement;
  receive a second database transaction statement corresponding to the first session; and
  determining a maximum number of work threads in the thread pool by:
    generate a new idle work thread to increase the maximum number of work threads in the thread pool when the feedback indicates a successful execution of the first database transaction statement and based on an availability of a hardware resource of the one or more processors in the computing device;
    execute the second database transaction statement to the database via the new idle work thread in the thread pool based on the execution status of the first database transaction statement;
    receive, via the feedback data path, second feedback from the database regarding an execution status of the second database transaction statement; and
    adjust the thread pool based on the second feedback.

11. The system of claim 10, wherein to execute the second database transaction statement, the at least one processor is further configured to:
  obtain the execution status of the first database transaction statement by obtaining session status information corresponding to the first session.

12. The system of claim 10, wherein to execute the second database transaction statement when the execution status of the first database transaction statement indicates that the first database transaction statement has completed execution, the at least one processor is further configured to:
  wherein generating the new idle work thread is further based on a determination that an idle work thread is not available in the thread pool.

13. The system of claim 10, wherein to execute the second database transaction statement when the execution status of the first database transaction statement indicates that the first database transaction statement has not completed execution, the at least one processor further configured to:
  cache the second database transaction statement; and
  retrieve the second database transaction from the cache when the first database transaction statement has completed execution.

14. The system of claim 10, the at least one processor further configured to:
  remove session status information from the first work thread executing the first database transaction; and
  store the session status information in a data structure.

15. The system of claim 10, the at least one processor further configured to:

update, based on the first feedback, session status information corresponding to the first session.

16. The system of claim 10, wherein the second feedback comprises a database error message, the adjusting the thread pool comprises removing a work thread from the thread pool.

17. The system of claim 10, the at least one processor further configured to:
execute a third database transaction statement corresponding to a second session on the first work thread.

18. The system of claim 10, wherein the second database transaction statement and the first database transaction statement comprise identical data.

19. A non-transitory computer-readable device having instructions stored thereon that, when executed by at least one computing device comprising one or more processors and a thread pool, causes the at least one computing device to perform operations comprising:
simulating a plurality of sessions, wherein each session of the plurality of sessions represents a respective client computer attempting to access a database and wherein the one or more processors are connected to the database via the thread pool;
executing, via an execution data path connecting the one or more processors and the thread pool, a first database transaction statement to the database via a first work thread in the thread pool, wherein the first database transaction statement corresponds to a first session of the plurality of sessions;
receiving, via a feedback data path that is separate from the execution data path connecting the one or more processors and the thread pool, feedback from the database regarding an execution status of the first database transaction statement; and
determining a maximum number of work threads in the thread pool by:
generating a new idle work thread to increase the maximum number of work threads in the thread pool when the feedback indicates a successful execution of the first database transaction statement and based on an availability of a hardware resource of the one or more processors in the computing device; and
executing, via the execution data path, a second database transaction statement to the database via the new idle work thread in the thread pool based on the execution status of the first database transaction statement.

20. The non-transitory computer-readable device of claim 19, wherein the execution status of the first database transaction statement indicates that the first database transaction statement has completed execution, the executing the second database transaction statement further comprises:
wherein generating the new idle work thread is further based on a determination that an idle work thread is not available in the thread pool.

* * * * *